United States Patent
McMillen (10) Patent No.: US 9,440,273 B2
(45) Date of Patent: Sep. 13, 2016

(54) FLEXIBLE TUBE, MANUFACTURING METHOD AND APPARATUS

(75) Inventor: Paul McMillen, Bolton (CA)

(73) Assignees: Paul McMillen, Bolton (CA); Marc Fitzner, Mississauga (CA)

( * ) Notice: Subject to any disclaimer, the term of this patent is extended or adjusted under 35 U.S.C. 154(b) by 318 days.

(21) Appl. No.: 13/810,841

(22) PCT Filed: May 2, 2011

(86) PCT No.: PCT/CA2011/000520
§ 371 (c)(1),
(2), (4) Date: Mar. 29, 2013

(87) PCT Pub. No.: WO2012/009784
PCT Pub. Date: Jan. 26, 2012

(65) Prior Publication Data
US 2013/0319722 A1 Dec. 5, 2013

Related U.S. Application Data

(60) Provisional application No. 61/366,285, filed on Jul. 21, 2010, provisional application No. 61/445,161, filed on Feb. 22, 2011.

(51) Int. Cl.
| | |
|---|---|
| *H05K 13/00* | (2006.01) |
| *B21C 37/20* | (2006.01) |
| *B21C 37/12* | (2006.01) |
| *H01B 13/004* | (2006.01) |
| *B21C 37/26* | (2006.01) |
| *F16L 11/14* | (2006.01) |
| *H01B 13/26* | (2006.01) |

(52) U.S. Cl.
CPC ............ *B21C 37/20* (2013.01); *B21C 37/121* (2013.01); *B21C 37/126* (2013.01); *B21C 37/26* (2013.01); *F16L 11/14* (2013.01); *H01B 13/004* (2013.01); *H01B 13/26* (2013.01)

(58) Field of Classification Search
CPC ... B21C 37/121; B21C 37/126; B21C 37/20; B21C 37/26; F16L 11/14; H01B 13/004; H01B 13/26
USPC .................................................... 174/102 SP
See application file for complete search history.

(56) References Cited

U.S. PATENT DOCUMENTS

| | | | | |
|---|---|---|---|---|
| 3,707,170 A | * | 12/1972 | Mazuir | B21C 37/121 138/134 |
| 4,387,498 A | * | 6/1983 | Morhard | B21C 37/12 156/162 |
| 4,783,980 A | * | 11/1988 | Varga | B21C 37/124 72/49 |
| 7,702,203 B1 | * | 4/2010 | Bohler | G02B 6/443 385/107 |

* cited by examiner

*Primary Examiner* — Timothy Thompson
*Assistant Examiner* — Paul McGee, III
(74) *Attorney, Agent, or Firm* — Dinsmore & Shohl LLP (57) ABSTRACT

Apparatus for use with two or more supplies of strip metal comprises, for each supply, a strip feeder and a bending head, the feeder being adapted to receive metal from said each supply and deliver same to the head which is adapted to receive and curl metal from the feeder to produce a strip part encircling a central axis in a coiling manner. The heads and feeders are adapted such that the part axes are coincident and the parts are axially offset from one another, with axially adjacent parts being positioned relative to one another throughout their lengths to define a metal strip which encircles the coincident axes in a coiling manner, the metal strip defining a tubular arrangement which can be used at least for armor cable. The parts can have cross sections such that they interlock throughout their lengths and the strip interlocks with itself throughout its length.

15 Claims, 11 Drawing Sheets

FLEXIBLE TUBE, MANUFACTURING METHOD AND APPARATUS

CROSS-REFERENCE TO RELATED APPLICATIONS

This application is the U.S. National Phase of PCT/CA2011/000520 filed May 2, 2011, which claims priority of U.S. Provisional Applications 61/366,285 filed Jul. 21, 2010, and 61/445,161 filed Feb. 22, 2011.

FIELD OF THE INVENTION

The present invention relates to the field of armour cable and similar products.

BACKGROUND OF THE INVENTION

In modern manufacturing, there exists an ongoing challenge to reduce costs. The field of armour cable production is no exception. A commonplace method for producing armour cable involves passing cable through the rotating carriage of a coiling machine. The rotating carriage carries one or more spools of metal (typically aluminum, galvanized steel or stainless steel) in strip form. As the carriage rotates, strip metal is drawn from the spool and passed through roll-forming dies to produce a cross-section that is amenable to interlocking with itself once coiled. The formed metal strip is then fed to a bending head, which puts a curl into the metal strip so that it assumes a helical form, around the central cable, in interlocking relationship with itself. The aforementioned cost-reduction imperative has, in recent years, fed to significant improvements in production speeds from a given machine; whereas in or about 1995, a typical carriage might rotate at about 800 rpm, in 2011, speeds of about 1400 rpm are not uncommon.

SUMMARY OF THE INVENTION

An improved product forms one aspect of the invention. The product is of the type having a metal strip encircling a central longitudinal axis in a coiling manner, the strip defining a tubular arrangement. The improvement comprises the strip being defined by two or more strip parts, the two or more strip parts each encircling the axis in a coiling manner and being offset from one another in the direction of the axis.

According to another aspect of the invention, the strip and strip parts can each encircle the axis in a helical manner, the strip parts have cross sections such that the strip parts are interlocked together throughout their lengths and the strip is interlocked with itself throughout its length to define a flexible metal tube.

According to another aspect of the invention, the product can be selected from armour cable and flexible conduit.

According to another aspect of the invention, the strip parts can overlap one another throughout their length and the strip can overlap itself throughout its length to define a flexible metal tube.

According to another aspect of the invention, the strip parts can have a Z profile, the flexible metal tube can be obround in cross section and the product can be downwell pump cable.

According to another aspect of the invention, the two or more strip parts can consist of two identical strip parts.

Apparatus for use with two or more supplies of strip metal forms another aspect of the invention. This apparatus comprises, for each strip metal supply, a strip feeder and a bending head. The strip feeder is adapted to receive strip metal from said each supply and deliver same to the bending head. The bending head is adapted to receive strip metal from the strip feeder and put a curl therein to produce therefrom a strip part encircling a central longitudinal axis in a coiling manner. The bending heads and strip feeders are adapted such that the axes of the strip parts are coincident and the strip parts are offset from one another therealong, with axially adjacent strip parts being positioned in relation to one another throughout their lengths to define a metal strip which encircles the coincident axes in a coiling manner, the metal strip defining a tubular arrangement.

According to another aspect of the invention, the bending heads and strip feeders can be adapted such that: the strip and strip parts each encircle the axis in a helical manner; the strip parts have cross sections such that the strip parts are interlocked together throughout their lengths and the strip is interlocked with itself throughout its length; and the tubular arrangement is a flexible metal tube.

According to another aspect of the invention, the bending heads and strip feeders can be adapted such that: the strip parts overlap one another throughout their length; the strip overlaps itself throughout its length; and the tubular arrangement is a flexible metal tube.

According to another aspect of the invention, the bending heads and strip feeders can be adapted such that the strip parts have a Z profile.

Apparatus for use with two or more supplies of strip metal and a supply of cable forms another aspect of the invention. This apparatus comprises a cable feeder and, for each strip metal supply, a strip feeder and a bending head. The strip feeder is adapted to receive strip metal from said each supply and deliver same to the bending head. The bending head is adapted to receive strip metal from the strip feeder and put a curl therein to produce therefrom a strip part encircling a central longitudinal axis in a helical manner. The bending heads and strip feeders are adapted such that the axes of the strip parts are coincident and the strip parts are offset from one another therealong, to define a tubular arrangement. The cable feeder is adapted to receive cable from the supply and feed same to the strip feeders and bending heads such that the cable is encapsulated by the tubular arrangement.

According to another aspect of the invention, the strip feeders and bending heads can be adapted such that axially adjacent strip parts are interlocked to one another throughout their lengths to define a metal strip and the metal strip is interlocked with itself throughout its length to form a flexible tube which defines the tubular arrangement.

According to another aspect of the invention, the strip feeders and bending heads can be adapted such that axially adjacent strip parts are in overlapped relation to one another throughout their lengths to define a metal strip and the metal strip is overlapped with itself throughout its length to form a flexible tube which defines the tubular arrangement.

An improved production method forms another aspect of the invention. The method is of the type wherein a metal strip is coiled around one or more cables to provide a tubular arrangement surrounding the one or more cables. The improvement comprises: the metal strip being defined by two or more strip parts, the two or more strip parts being offset from one another in the direction of the one or more cables.

According to another aspect of the invention: in the metal strip, axially adjacent strip parts can be interlocked to one another throughout their lengths; and the metal strip can be interlocked with itself throughout its length to form a flexible tube which defines the tubular arrangement.

According to another aspect of the invention: in the metal strip, axially adjacent strip parts can be in overlapped relation to one another throughout their lengths; and the metal strip can be overlapped upon itself throughout its length to form a flexible tube which defines the tubular arrangement.

Apparatus for use with a supply of strip metal forms another aspect of the invention. This apparatus comprises:

one or more sets of spools, each set including two or more spools, each spool having a central passage and a central axis and receiving in use a respective coil of said strip metal, said coil having a cylindrical core coaxial with the central axis and through which the passage extends;

a frame having a rotation axis, the frame supporting the spools such that the central axes of the spools are coaxial with the rotation axis, the spools are axially-spaced from one another in a production direction and are rotatable about the rotation axis;

for each set of spools, a pay-off apparatus mounted to the frame for rotation about the rotation axis and having a position for each of the spools in said each set, the pay-off apparatus, when in the position for said each spool and in use, drawing said strip metal from a previously-received coil on said each spool and delivering said strip metal through the passage of said spool and all spool passages downstream in the production direction; and an actuator arrangement adapted to: (i) cycle each pay-off apparatus through its positions; (ii) in each set, rotate at least the spool for which the pay-off apparatus is positioned and one other spool in a manner which permits strip metal from said supply to be wound on said one other spool at least in part contemporaneous with the withdrawal of strip metal from the spool for which the pay-off apparatus is positioned; and (iii) rotate each pay-off apparatus such that in use, as strip metal, drawn from the spool for which said each pay-off apparatus is positioned, exits the final spool passage in the downstream direction, said strip metal rotates about the rotational axis at a rate defined by the rate of rotation of said each pay-off apparatus.

According to another aspect of the invention, the pay-off apparatus can rotate at the same rate and in sync.

According to another aspect of the invention, the apparatus can further comprise a winder for each set of spools which winder, in use, receives metal from said supply, lubricates said metal and winds said metal onto said one other spool.

According to another aspect of the invention:

the frame can include: (i) a hollow pintle which defines the rotation axis; and (ii) an intermediate cylindrical shaft arrangement mounted in concentric relation about the hollow pintle for rotation thereabout and from which the pay-off apparatus extend, the intermediate shaft having, for each pay-off apparatus, a slot through which the strip metal delivered by said each pay-off apparatus traverses, the slots each extending in parallel, offset relation to said rotational axis and being disposed on opposite radial sides thereof; and the spools can be mounted in concentric relation to and rotate operatively about the intermediate cylindrical shaft arrangement.

According to another aspect of the invention, the apparatus can further comprise:

a conduit former, the conduit former including: for each pay-off apparatus, a strip feeder and a bending head, the strip feeder being adapted to receive strip metal delivered from said each pay-off apparatus as it exits the final spool passage in the downstream direction and deliver same to the bending head, the bending head being adapted to receive strip metal from the strip feeder and put a curl therein to produce therefrom a strip part encircling a central longitudinal axis in a helical manner, the bending heads and strip feeders being adapted such that the axes of the strip parts are coincident and the strip parts are offset from one another therealong, to define a tubular arrangement; and a cable feeder which, in use, feeds cable to the conduit former such that the cable is encapsulated by the tubular arrangement.

This apparatus can be provided and operated as part of a method for use with a supply of strip metal which forms another aspect of the invention. This method comprises the steps of: providing the apparatus; and operating the apparatus such that strip metal from the supply is wound on the one other spool in each set of spools at least in part contemporaneous with the withdrawal of strip metal from the spools for which the pay-off apparatus is positioned. The method is characterized in that:

each pay-off apparatus cycles to a new position when the strip metal on the spool for which it is positioned is exhausted;

when each pay-off apparatus assumes a new position, the spools of the set for which said pay-off apparatus is provided are stationary; and an operator welds the trailing end of the strip metal on the spool from which the pay-off mechanism is positioning to the leading end of the strip metal of the spool to which the pay-off mechanism is positioning.

According to another aspect of the invention, in this method, the one other spool and the spool from which metal strip is being withdrawn, can, at times, rotate contemporaneously and at different speeds.

Advantages, features and characteristics of the present invention, as well as methods of operation and functions of the related elements of the structure, will become apparent upon consideration of the following detailed description and the appended claims with reference to the accompanying drawings, the latter being briefly described hereinafter.

DESCRIPTION

Figure 1:
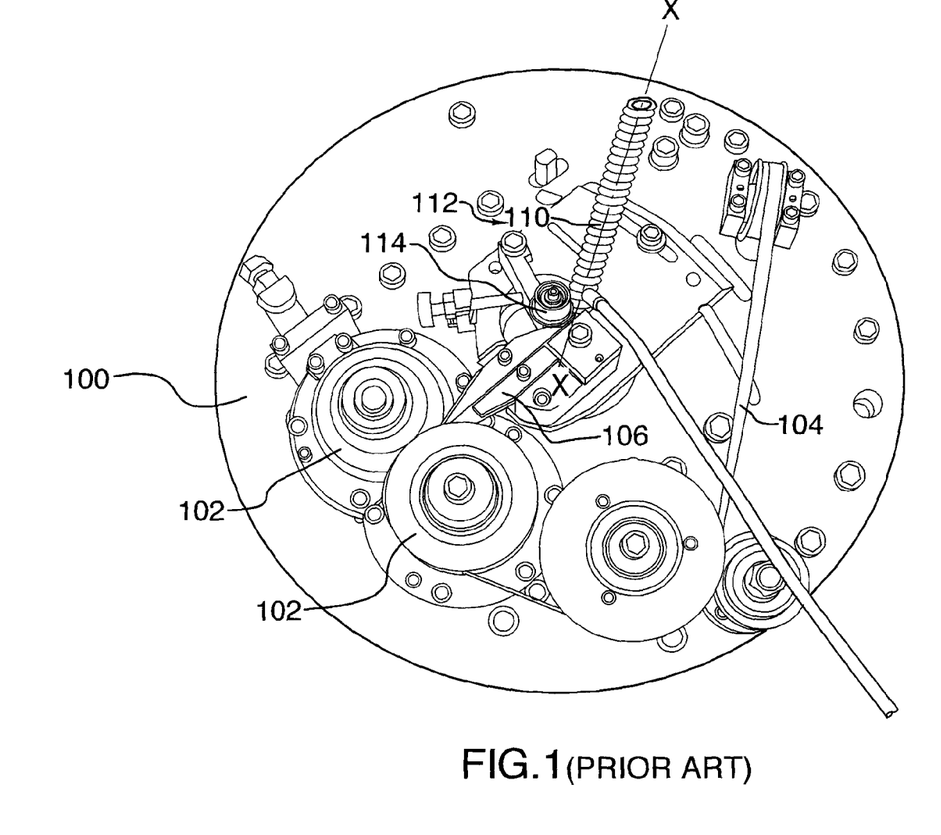
FIG. 1 is a view of a prior art apparatus showing a rotatable carriage carrying roll-forming dies and with profiled strip metal being fed towards a bending head by a strip feeder, the profiled strip metal and bending head not being clearly visible.
Figure 2:
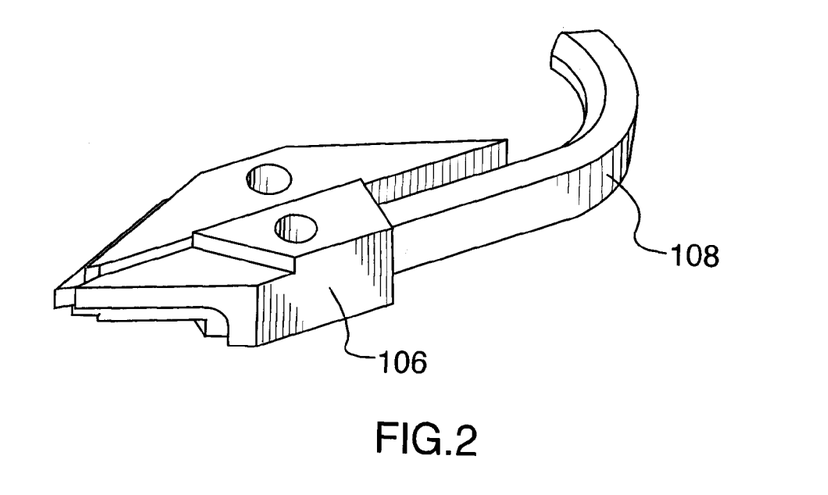
FIG. 2 is a partial, enlarged, not-to-scale, partially schematic view of FIG. 1, showing the bending head and the strip feeder.

FIG. 1 and FIG. 2 are views of a prior art apparatus for producing armour cable.

In FIG. 1, a rotatable carriage 100 will be seen to be in carriage of a pair of roll-forming dies 102 receiving unprofiled (i.e. flat) strip metal 104 and a strip feeder 106 receiving profiled strip metal (not visible) from the roll-forming dies 102. Although not shown, the carriage 100 will also be understood to be in carriage of a spool of aluminum strip material from which the strip metal 104 is being drawn.

FIG. 2 is an enlarged, partially perspective, partially schematic and notto-scale view of the structure of FIG. 1, showing the strip feeder 106 and a bending head 108.

Returning to FIG. 1, the bending head 108 is adapted to receive profiled strip metal from the strip feeder 106 and put a curl therein to produce therefrom a strip part 110 encircling a central longitudinal axis X-X in a helical manner. The profile in the profiled, curled, metal is such that the strip part 110 interlocks with itself along its length, to define a flexible conduit 112. A support roller 114 is also shown. This supports the conduit 122, from the side opposite the curl in the bending head 108, so as to ensure proper coiling.

Although not shown, it will be understood that a cable feeder is also provided in this prior art apparatus, the cable feeder being adapted to receive cable from a supply and feed same to the strip feeder and bending head such that the cable is encapsulated by the conduit.

Figure 3:
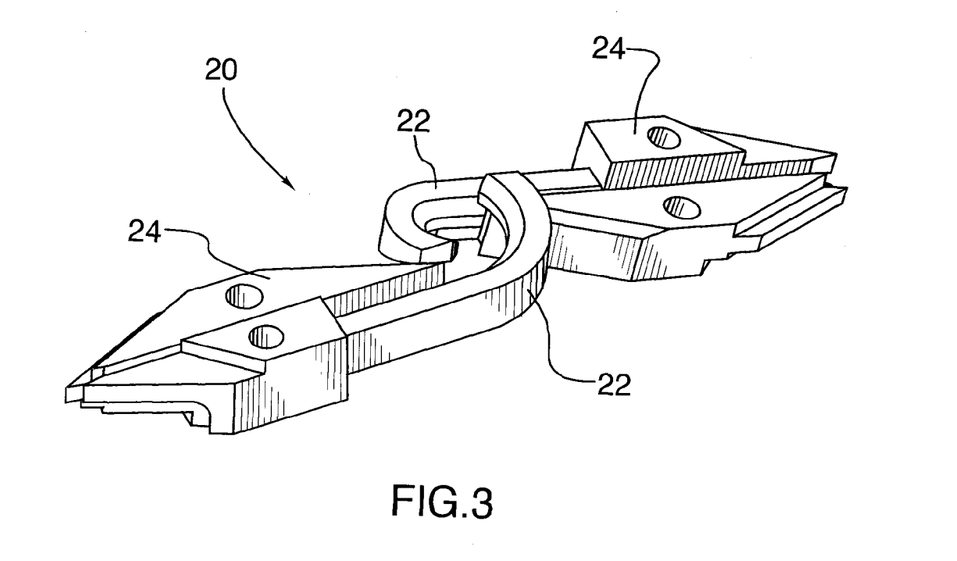
FIG. 3 is a view of a part of apparatus according to an exemplary embodiment of the invention, the part shown of the exemplary embodiment being similar to the part of the prior art structure shown in FIG. 2.

FIG. 3 shows a view of a part of a coiling apparatus 20 according to an exemplary embodiment of the present invention, which partial view shows a structure which is as to the entire coiling apparatus 20 of the exemplary embodiment as FIG. 2 is to FIG. 1.

From this FIG. 3, it will be understood that the present invention represents a departure from the prior art in that, whereas the prior art contemplates a single bending head and a single strip feeder, the present invention contemplates more than one bending head 22 and more than one strip feeder 24.

Figure 4:
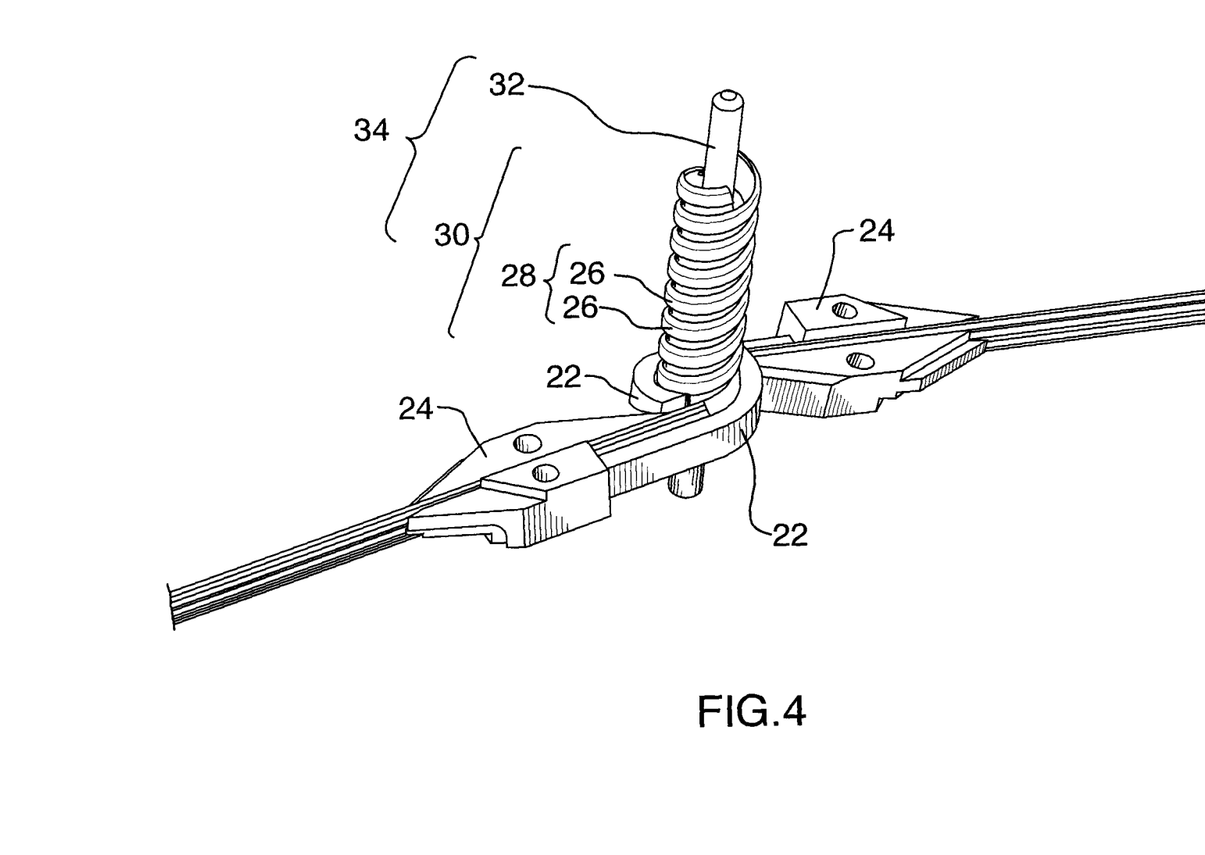
FIG. 4 is a view of the structure of FIG. 3 in use.
Figure 5:
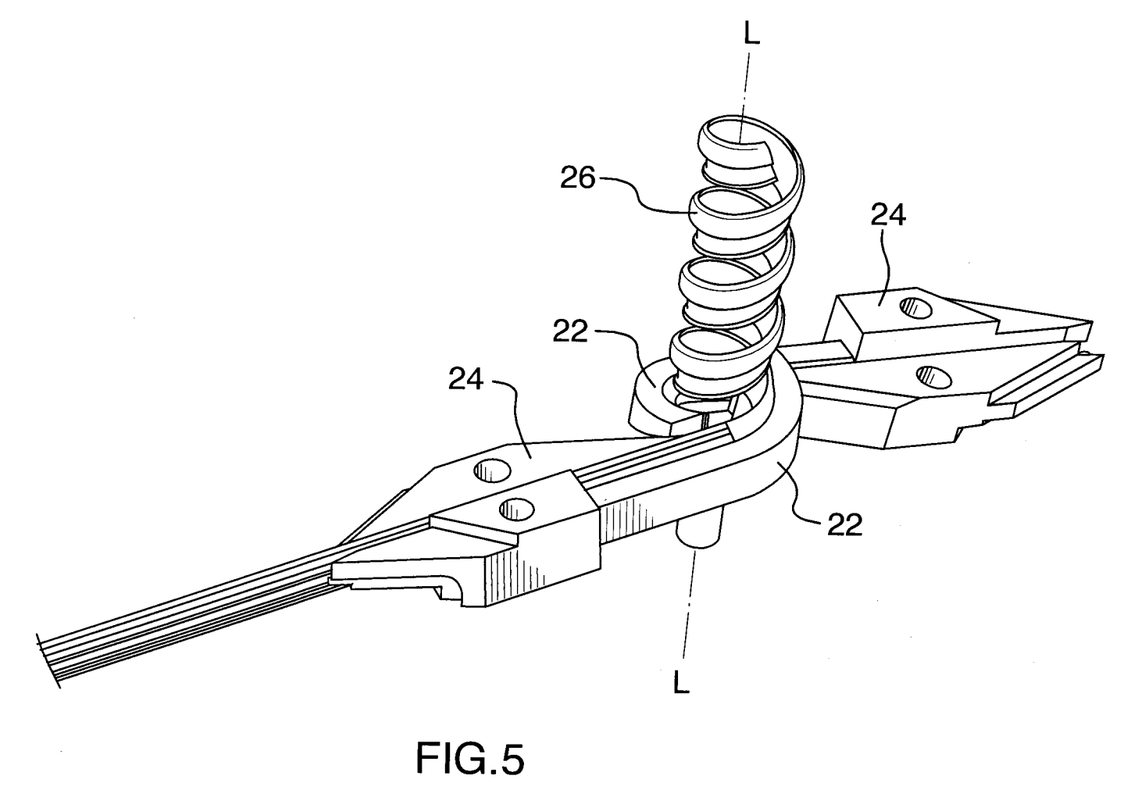
FIG. 5 is a view of the structure of FIG. 4, with portions removed for clarity.

The bending heads 22 and strip feeders 24 as shown are generally similar to those of the prior art, in that each bending head curls metal in a coiling manner to form a helical metal strip part 26, but in the exemplary embodiment of the invention, the multiple bending heads 22 and strip feeders 24 are adapted such that, in use, the axes of the helical strip parts 26 respectively produced thereby are coincident and the strip parts 26 are offset from one another along that axis, with axially adjacent strip parts 26 being interlocked to one another throughout their lengths to define a helical metal strip 28, the helical metal strip being interlocked with itself throughout its length to define a flexible tubular arrangement 30 which encapsulates the cable 32, to form an armour cable 34. All of the foregoing is shown in FIG. 4, wherein the metal strip parts are identified by 26, the metal strip is identified by 28, the cable is identified by 32, the conduit is identified by 30 and the armor cable is identified by 34. FIG. 5 is a view, similar to FIG. 4, but with one of the metal strips 26 removed and the cable 32 removed, to better evidence the helical structure of the remaining helical strip part 26 and the longitudinal axis thereof, indicated with L-L.

Figure 6:
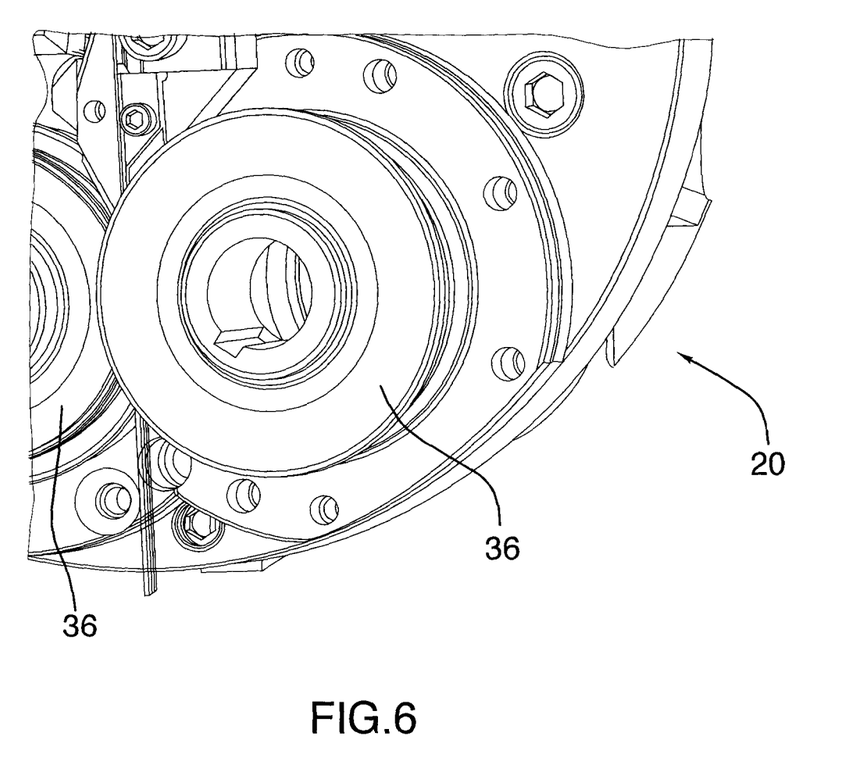
FIG. 6 is a view, different than the view of FIG. 3, of another part of the exemplary apparatus.

For greater certainty, in the exemplary embodiment, the interlock between the strip parts 26 and the interlock between the metal strip 28 and itself flows from the profile provided, for example, by roll-forming dies, indicated by 36 in FIG. 6, i.e. in a manner generally analogous to the interlock between the single strip part 110 and itself along its length in the prior art.

Persons of ordinary skill in the art will readily appreciate that the armour cable produced by the present method is generally similar to armour cable of the prior art, the improvement being that the usual metal strip which forms the coil is defined by a pair of strips, which are interlocked to one another in substantially the same manner as the manner in which the prior art single strip is interlocked to itself.

Visually, the primary difference between the armour cable of the present invention and armour cable of the prior art relates to the helix angle, which, all things being equal, is twice that of the prior art version.

This aspect of the invention allows for relatively high production speeds at relatively low rates of carriage rotation, with commensurate advantages in terms of safety. Another advantage associated with the use of dual strips relates to the ability to avoid the use of the support roller used in the prior art to support the coil; in this aspect of the present invention, the opposed strips support one another. This has advantage in terms of reduced cooling requirements, i.e. there is no need to provide cooling for the support roller.

Figure 7A:
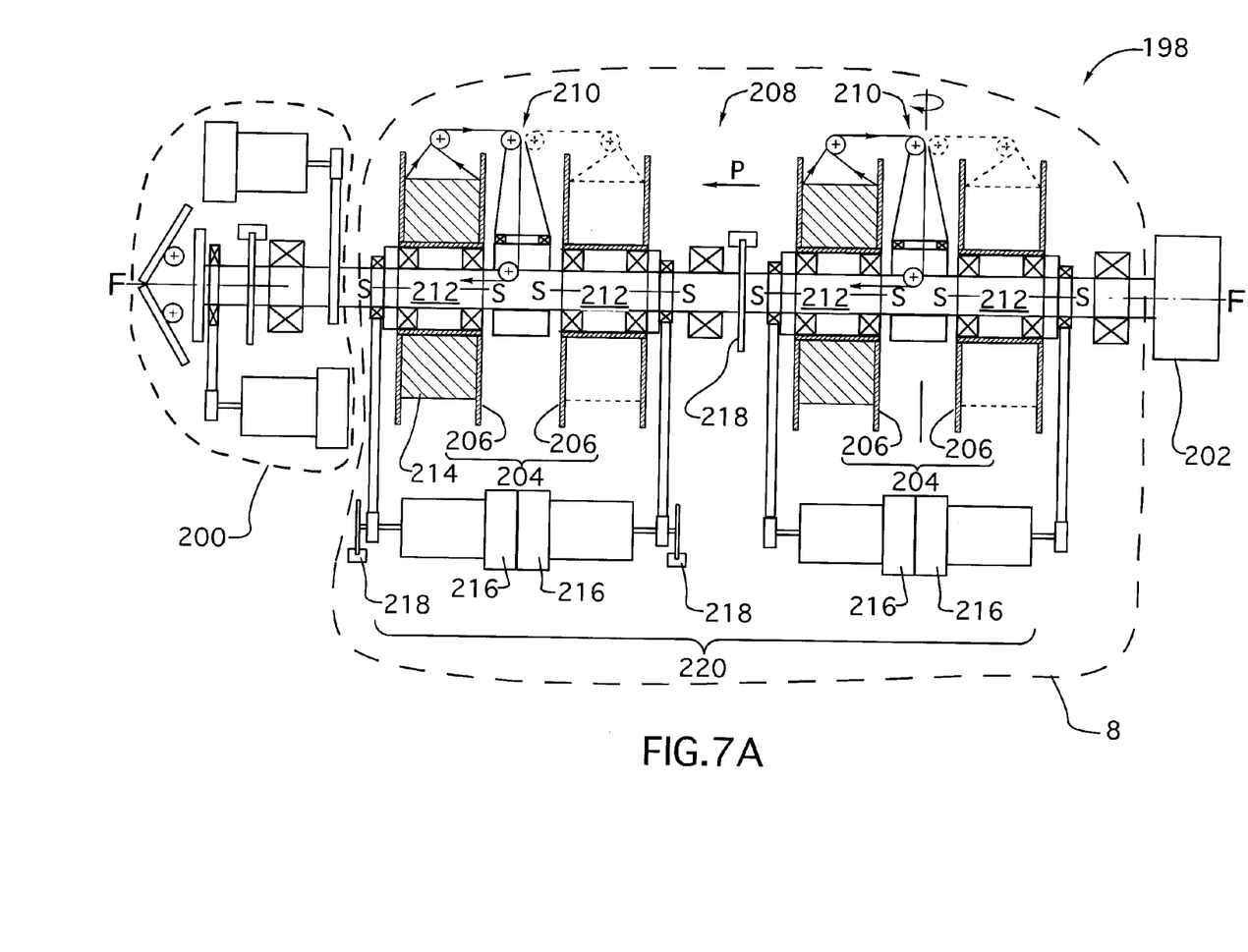
FIG. 7A is a schematic top view of the exemplary embodiment which includes the apparatus of FIG. 3.
Figure 7B:
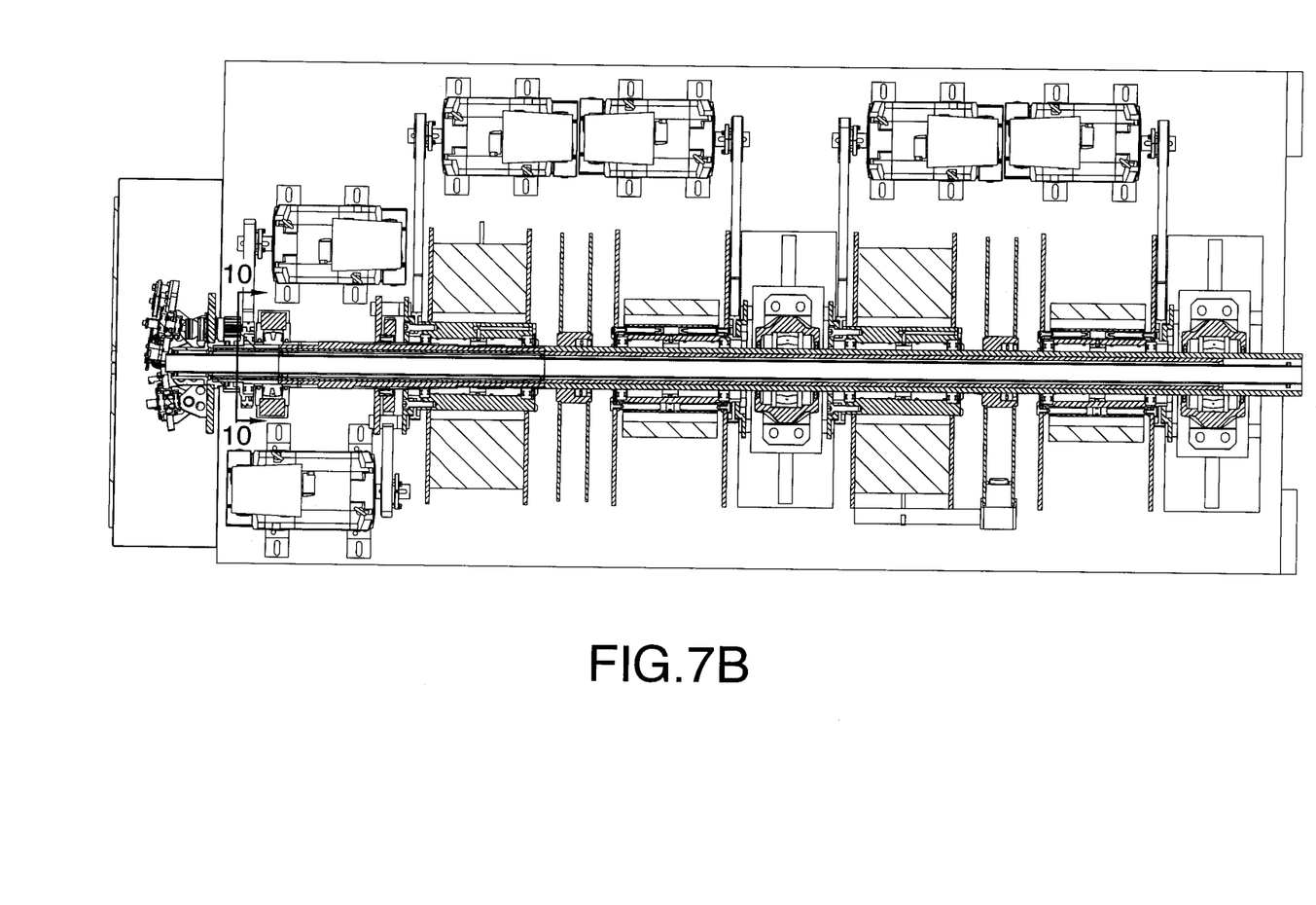
FIG. 7B is a top view of the exemplary embodiment, showing greater detail than in FIG. 7A.

An advantageous deployment of the foregoing arrangement is shown schematically in FIG. 7A and in detail in FIG. 7B. With reference to FIG. 7A, this illustration shows an armour cable production facility 198 and will be seen to include, in addition to the bending heads and strip formers, shown schematically as conduit former 200, and in addition to the cable feeder, indicated by 202: two sets 204 of spools, each set 204 including two spools 206; a frame, indicated generally by 208; and, for each set of spools, a pay-off apparatus 210.

Each spool 206 will be seen to have a central passage 212 and a central axis S-S and will be understood to be adapted to receive in use a respective coil 214 of said strip metal, said coil 214 having a cylindrical core coaxial with the central axis S-S and through which the passage 212 extends.

Frame 208 will be seen to have a rotation axis F-F and will be understood to support the spools such that the central axes S-S of the spools 206 are coaxial with the rotation axis F-F, the spools 206 are axially-spaced from one another in a production direction P and are rotatable about the rotation axis F-F.

The pay-off apparatus 210 will be understood to be mounted to the frame 208 for rotation about the rotation axis F-F and have a position for each of the spools in said each set; this is indicated in FIG. 7A by the phantom lines, which show the other positions to which the pay-off apparatus 210, shown in blackline, can assume.

Figure 9:
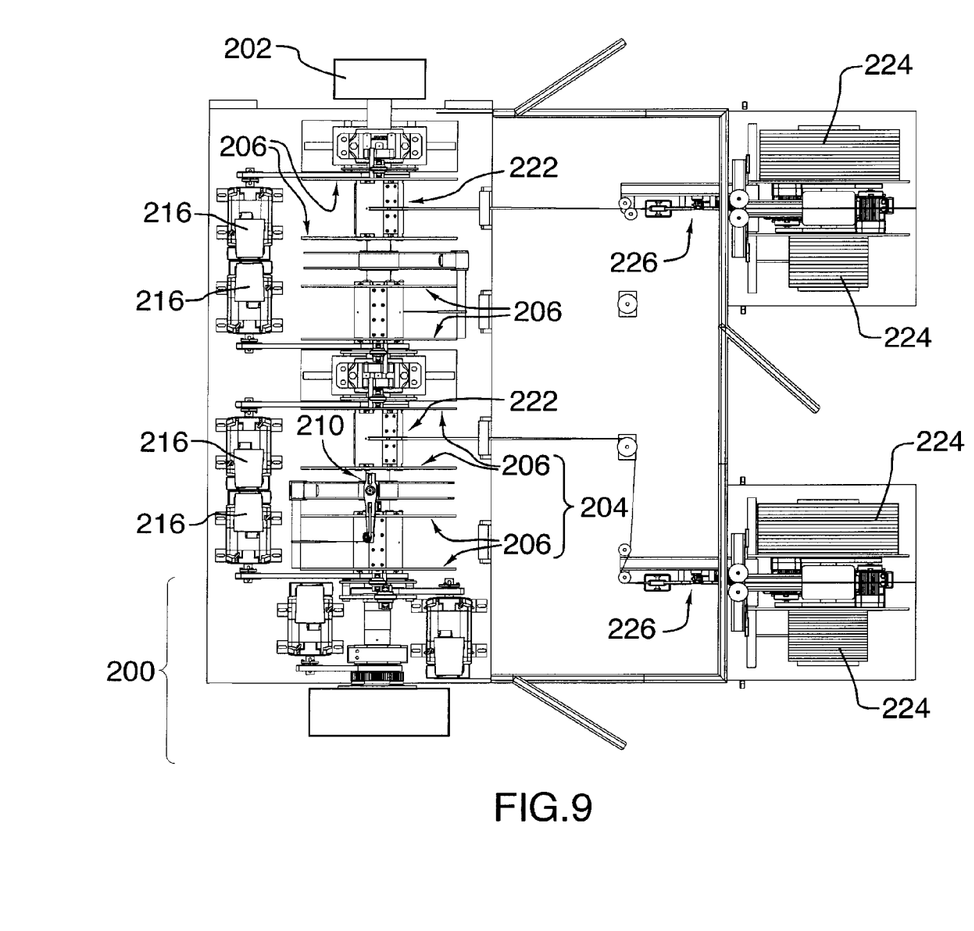
FIG. 9 is a top plan view of the structure of FIG. 7B in use.

The facility 198 should be also understood to include
   an actuator arrangement 220 which, as shown in FIG. 7A,
      comprises a plurality of servo-controlled motors 216 and brakes 218 and is adapted to: cycle each pay-off apparatus 210 through its positions; in each set, rotate at least the spool for which the pay-off apparatus is positioned and the other spool at least in part contemporaneously; and rotate each pay-off apparatus 210 around the rotation axis F-F.

for each set of spools, a winder 222 as shown in FIG. 9, the winder 222 being of the type which is adapted to receive metal from a supply and wind said metal onto a rotating spool and, in this embodiment, further being adapted such that it lubricates the metal in the winding process via a strip bath. Although not shown in detail, it will be understood that each winder terminates in a rotating sheave which is adapted to traverse between the spools in the set as needed, i.e. move in the direction of axis F-F, to also move radially with respect to axis F-F as needed (as the pad grows in diameter) to precisely lay down the metal to form a tight pad.

FIG. 7A shows one of the spools 206 in each set 204 loaded with a coil 214 of the metal strip that has been lubricated; this is an initial step in operation. Operation of the facility also requires the provision of supplies of cable to be armoured and metal strip to be used for armouring, which are both delivered to the exemplary facility in reels.

The cable to be armoured is fed in a conventional manner through the spool passages in the downstream direction P, i.e. from right-to-left in the illustration of FIG. 7A. As each cable reel is exhausted, it is replaced with a fresh reel. Although not shown in FIG. 7A, an accumulator can be provided as part of cable feeder 202, to minimize production downtime associated with reel changeover.

In terms of the metal strip, in the exemplary facility, each set 204 of spools is provided with a supply of reels 224 and an accumulator 226. As each reel is exhausted, it is replaced with a fresh reel. The metal strip is delivered from the reels 224 via the accumulator 226, which minimizes production downtime associated with reel changeover.

In normal operation of the exemplary facility, which occurs batchwise:
  strip metal is always being withdrawn from one of the spools 206 in each set 204 by the pay-off apparatus 210; as this occurs, the other spool in said each set gets loaded with strip metal; and
  each pay-off apparatus 210 is rotating such that in use, as strip metal, drawn from the spool for which said each pay-off apparatus 210 is positioned, exits the final spool passage 212 in the downstream P direction, said strip metal rotates about the rotational axis F-F at a rate defined by the rate of rotation of said each pay-off apparatus 210.

Each batch is defined by the exhaustion of a previously-loaded coil; as a coil is exhausted:
  the spool in receipt of said coil, and the other spool in the set, are brought to rest
  the actuator 220 causes the pay-off apparatus to transition to the other spool, which by that time has been loaded with a fresh coil of metal strip; and
  an operator welds the trailing end of the strip metal on the spool from which the pay-off mechanism is positioning to the leading end of the strip metal of the spool to which the pay-off mechanism is positioning.

Persons of ordinary skill will appreciate that, in normal operation above, it will be necessary to provide for a structure wherein the spools, inter alia, rotate at different rates from the pay-off mechanisms. An exemplary embodiment of a frame which accommodates the foregoing is shown in FIGS. 7-10 and will be seen to include, inter alia, a hollow pintle 228 and an intermediate cylindrical shaft arrangement 238. The hollow pintle 228 defines the rotation axis F-F (and is hollow to permit throughpassage of the cable to be armoured).

Figure 8:
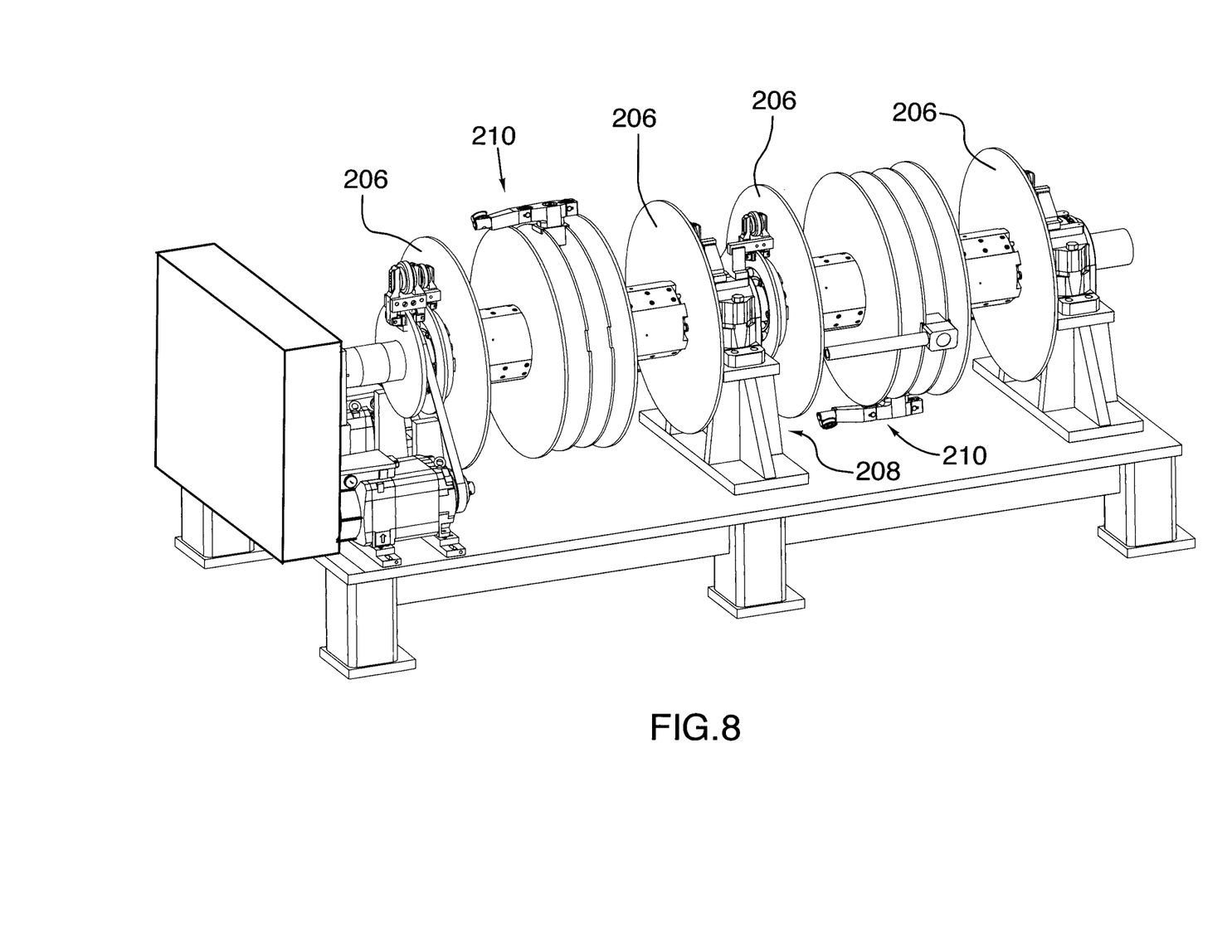
FIG. 8 is a perspective view of the structure of FIG. 7B.
Figure 10:
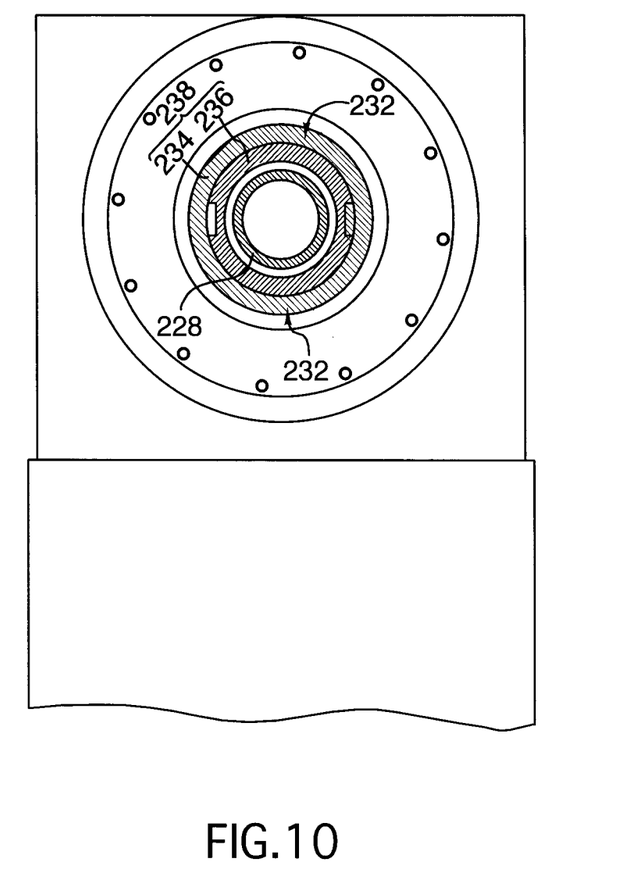
FIG. 10 is a view along section 10-10 of FIG. 7B.

The intermediate cylindrical shaft arrangement 238:
  is mounted in concentric relation about the hollow pintle 228 for rotation thereabout
  has the pay-off apparatus extending therefrom
  has, for each pay-off apparatus, a slot 232 through which the strip metal delivered by said each pay-off apparatus traverses, the slots 232 each extending in parallel, offset relation to said rotational axis F-F and being disposed on opposite radial sides thereof;
  operatively, rotatably carries the spools 206; and
  is defined by inner 234 and outer 236 concentric shaft parts.

As a practical matter, this will require independent servo control for the spool-driving motors, winders and the motors driving the pay-off apparatus. Persons of ordinary skill fully understand servo-control, and accordingly, detailed description thereof is neither required nor provided.

The foregoing allows for significant advantage, including but not limited to:
  precise winding of each coil on the apparatus, through the use of a dedicated winder, means that off-balance issues associated with faulty third-party coil shipments are eliminated
  pre-lubrication of the metal strip in the winding process via a strip bath avoids the need for a spray mist at the tooling head; this improves ambient air quality and avoids lubricant waste
  winding of the coil's onto the apparatus means that the actual production machine is not exposed to damage associated with the use of heavy equipment for reel changeover Whereas but a single method, apparatus and product are described, persons of ordinary skill will readily appreciate that variations are possible.

For example, whereas a specific embodiment of a pay-off mechanism is shown, inter alia, in FIG. 8, this is not necessary. For example, a pair of metal spools could equally be carried in eccentric manner on a rotating carriage. Further, embodiments are possible wherein the bending heads are motionless and the coiled product rotates around its longitudinal axis as it is produced. As well, whereas rotating roll-forming dies are contemplated, this is also not strictly required; for example, embodiments are possible wherein the spools of strip metal carried by the carriage are pre-profiled, and simply delivered to the bending head by the strip feeder.

As well, whereas two sets of spools are illustrated, each including two spools, it will be evident that greater or lesser number of spools and sets can be used. For example, to make a flexible conduit having three strip parts, three sets of spools might be provided. As well, it could be possible to use greater numbers of spools in each set.

Figure 11:
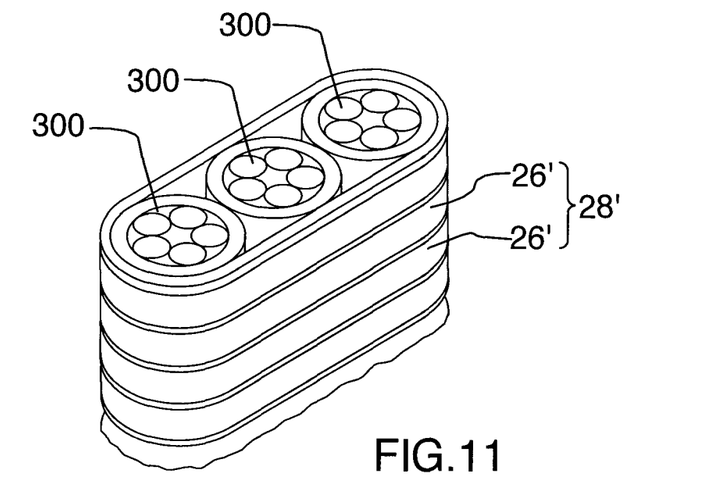
FIG. 11 is a perspective view of a length of down well pump cable made according to one embodiment of the inventive method.
Figure 12:
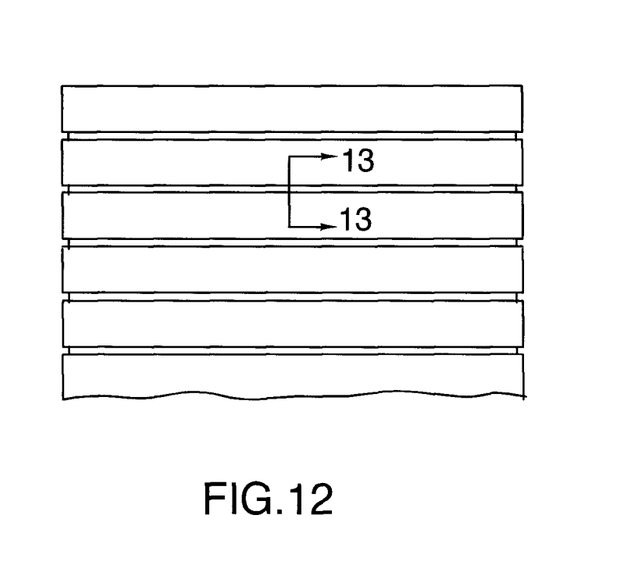
FIG. 12 is an end view of the structure of FIG. 11.
Figure 13:
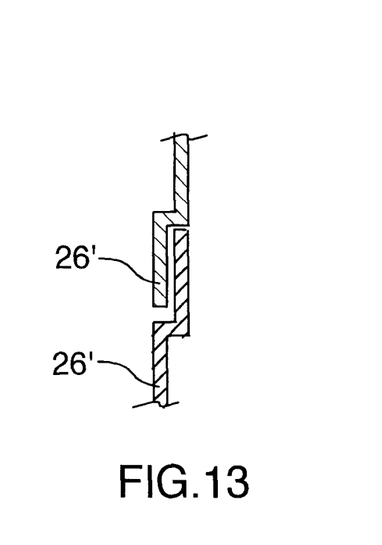
FIG. 13 is a view along 13-13 of FIG. 12.

Additionally, whereas armour cable production is described, the invention is equally useful for the production of flexible conduit. Similarly, downwell pump cable can also be produced. FIG. 11-13 show a type of downwell pump cable that can be produced according to the invention. This cable has metal strip parts 26' forming a strip 28' that is coiled around a core of three electrical cables 300. However, in contrast to typical armor cable, these strip parts 26' have a Z-profile as illustrated in FIG. 13 and as such these strip parts do not interlock with one another but are merely overlapped by one another. The same applies with respect to the strip formed thereby; it does not interlock with itself, but merely overlaps itself. Yet other products can, of course, be made with the coiling apparatus and the pay-off mechanism.

Further, whereas a two-strip conduit is described, it will be evident that the pay-off apparatus has utility even in the context of conventional single-strip conduits.

As well, whereas a winder for each spool is shown, this is not necessary; another useful arrangement for the pay-off apparatus would entail a winder for each set of spools.

Further, whereas in the described embodiments, two identical helical strip parts are coiled to produce the tubular arrangement, greater numbers of strip parts can be used and the strip parts can be of different widths and thicknesses.

Variations in helix angle can and will also be made by persons of ordinary skill in the art to adjust for differences in production speed, strip thickness and strips used.

As well, whereas strip aluminum is specifically described, it will be appreciated that the present invention is useful with other metals, such as galvanized and stainless steels. Further, it will be evident that different types of strip metal could be wound on a single spool at the same time. This could permit, for example, a continuous flexible conduit that had a central portion of stainless and end portions out of aluminum.

Accordingly, the invention should be understood as limited only by the accompanying claims, purposively construed.

The invention claimed is:

1. An improved product, the product being of the type having a single layer metal strip encircling a central longitudinal axis in a coiling manner, the strip defining a tubular arrangement, wherein the improvement comprises:
the strip being defined by two or more separate strip parts, the two or more strip parts each having a common radius of curvature, encircling the axis in a coiling manner and being offset from one another in the direction of the axis.

2. A product according to claim 1, wherein the strip and strip parts each encircle the axis in a helical manner, the strip parts have cross sections such that the strip parts are interlocked together throughout their lengths and the strip is interlocked with itself throughout its length to define a flexible metal tube.

3. A product according to claim 2, wherein the product is selected from armour cable and flexible conduit.

4. A product according to claim 1, wherein the strip parts overlap one another throughout their length and the strip overlaps itself throughout its length to define a flexible metal tube.

5. A product according to claim 4, wherein the strip parts have a Z profile and the flexible metal tube is round in cross section.

6. A product according to claim 1, wherein the two or more strip parts consist of two identical strip parts.

7. Apparatus for use with two or more supplies of strip metal and a supply of cable, the apparatus comprising:
for each strip metal supply, an identical strip feeder and a bending head, the strip feeders being adapted to receive strip metal from said each supply and deliver same to the associated bending head, the bending head being adapted to receive strip metal from the strip feeder and put a curl therein of the same radius of curvature as the other bending head(s) to produce therefrom a strip part encircling a central longitudinal axis in a helical manner, the bending heads and strip feeders being adapted such that the axes of the strip parts are coincident and the strip parts are offset from one another therealong, to define a single layer tubular arrangement; and
a cable feeder adapted to receive cable from the supply and feed same to the strip feeders and bending heads such that the cable is encapsulated by the tubular arrangement.

8. Apparatus according to claim 7, wherein: the strip feeders and bending heads are adapted such that axially adjacent strip parts are interlocked to one another throughout their lengths to define a metal strip and the metal strip is interlocked with itself throughout its length to form a flexible tube which defines the single layer tubular arrangement.

9. Apparatus according to claim 7, wherein: the strip feeders and bending heads are adapted such that axially adjacent strip parts are in overlapped relation to one another throughout their lengths to define a single layer metal strip and the metal strip is overlapped with itself throughout its length to form a flexible tube which defines the tubular arrangement.

10. Apparatus according to claim 9, wherein the strip parts have a Z profile.

11. Apparatus for use with a supply of strip metal, the apparatus comprising:
two or more sets of spools, each set including two or more spools, each spool having a central passage and a central axis and receiving in use a respective coil of said strip metal, said coil having a cylindrical core coaxial with the central axis and through which the passage extends;
a frame having a rotation axis, the frame supporting the spools such that the central axes of the spools are coaxial with the rotation axis, the spools are axially-spaced from one another in a production direction and are rotatable about the rotation axis;
for each set of spools, a pay-off apparatus mounted to the frame for rotation about the rotation axis and having a position for each of the spools in said each set, the pay-off apparatus, when in the position for said each spool and in use, drawing said strip metal from a previously-received coil on said each spool simultaneously and delivering said strip metal through the passage of said spool and all spool passages downstream in the production direction; and
an actuator arrangement adapted to: (i) cycle each pay-off apparatus through its positions; (ii) in each set, rotate at least the spool for which the pay-off apparatus is positioned and one other spool in a manner which permits strip metal from said supply to be wound on said one other spool at least in part contemporaneous with the withdrawal of strip metal from the spool for which the pay-off apparatus is positioned; and (iii) rotate each pay-off apparatus such that in use, a plurality of metal strips are simultaneously drawn from the spools for which said each pay-off apparatus is positioned, exit the final spool passage in the downstream direction, and said strip metal rotates about the rotational axis at a rate defined by the rate of rotation of said each pay-off apparatus and forms a single layer tube.

12. Apparatus according to claim 11, wherein the pay-off apparatus rotate at the same rate and in sync.

13. Apparatus according to claim 11, further comprising a winder for each set of spools which, in use, receives metal from said supply, lubricates said metal and winds said metal onto said one other spool.

14. Apparatus according to claim 11, wherein the frame includes: (i) a hollow pintle which defines the rotation axis; and (ii) an intermediate cylindrical shaft arrangement mounted in concentric relation about the hollow pintle for rotation thereabout and from which the pay-off apparatus extend, the intermediate shaft having, for each pay-off apparatus, a slot through which the strip metal delivered by said each pay-off apparatus traverses, the slots each extending in parallel, offset relation to said rotational axis and being disposed on opposite radial sides thereof;

and wherein: the spools are mounted in concentric relation to and rotate operatively about the intermediate cylindrical shaft arrangement.

15. Apparatus according to claim 11, further comprising:

a conduit former, the conduit former including: for each pay-off apparatus, an identical strip feeder and a bending head, each strip feeder being adapted to receive strip metal delivered from said each pay-off apparatus as it exits the final spool passage in the downstream direction and deliver same to its associated bending head, the bending heads being adapted to receive strip metal from the strip feeders and put curls of the same radius of curvature therein to produce therefrom strip parts encircling a central longitudinal axis in a helical manner, the bending heads and strip feeders being adapted such that the axes of the strip parts are coincident and the strip parts are offset from one another therealong, to define a single layer tubular arrangement; and a cable feeder which, in use, feeds cable to the conduit former such that the cable is encapsulated by the tubular arrangement.

* * * * *